Patented Jan. 22, 1935

1,988,879

UNITED STATES PATENT OFFICE 1,988,879

ASPHALT EMULSIONS

Herbert M. Steininger, Kansas City, Mo., assignor to Standard Oil Company (Indiana), Chicago, Ill., a corporation of Indiana No Drawing. Application October 1, 1930
Serial No. 485,823

10 Claims. (Cl. 134—1)

This invention relates to asphalt emulsions and the method of making them, and it pertains more particularly to the "activation" of emulsifying soaps by means of certain salts.

The object of my invention is to reduce the necessary amount of emulsifying agents and to thereby reduce the cost of emulsions. A further object is to expedite emulsification and to increase the ease of emulsification. A further object is to provide a fluid emulsion containing a high percent of asphalt, which emulsion will be stable at excessively high and low temperatures and will be characterized by extreme smoothness and small particle size.

A further object is to provide an asphalt emulsion having new and useful viscosity characteristics. Other objects will be apparent from the following description.

I have discovered that with soap emulsifying agents the interfacial tension between the aqueous phase and the asphalt is reduced to a marked degree by the presence of certain amounts of mineral salts. The best results are obtained when the finished emulsion is kept neutral or basic, but alkalinity is not the only factor controlling the ease of emulsification. When 0.1 molar solutions of sodium sulphite, potassium chromate, sodium carbonate, etc., are substituted for water in the preparation of emulsions with soaps (particularly triethanolamine oleate) I have discovered that the amount of emulsifying agent may be reduced to less than one-half the amount heretofore required; that the resulting emulsion is fluid at lower temperatures and with greater amounts of asphalt, and that the emulsion is more stable and more permanent than emulsions formed in the absence of dilute salt solutions. My invention will be more clearly understood from the following description wherein I have set forth in detail a preferred embodiment thereof.

While the underlying principles of my invention are not limited to any particular asphalt (bitumen), emulsifier, or salt, I have described an emulsion made from specific ingredients. The asphalt may be an oxidized petroleum residuum having a penetration of 60 to 70 at 77° F., having a melting point (ball and ring method) of about 115° F., a specific gravity of about 1.00 and a flash of about 460° F. In my preferred embodiment I use a hydroxyalkylamine soap, such as triethanolamine oleate or stearate as an emulsifier.

I heat 2556 grams of the asphalt to a temperature of about 250° F. and incorporate or dissolve 31 cc. of oleic acid therein. In a separate container I dissolve 12 cc. of triethanolamine in 1400 cc. of a tenth molar solution of sodium sulphite. The triethanolamine solution is placed in a mixer and brought to a temperature of about 175° F. The mixer is then brought to a speed of about 600 R. P. M. and the hot asphalt is slowly added thereto and emulsified in the aqueous solution. After all of the asphalt has been added, the emulsion is beaten for five minutes at 600 R. P. M. and then is beaten for another five minutes at 1200 R. P. M. At the end of this time the emulsion is drawn off into a can or a suitable storage receptacle.

From the above description it will be seen that my formula is approximately as follows:

| | Percent by weight |
|---|---|
| Asphalt | 63.56 |
| Water | 34.00 |
| Oleic acid | .65 |
| Triethanolamine | .34 |
| Sodium sulphite | .45 |

The beater or mixer may be of any suitable construction. I have found that for making small batches, a small cylinder about 8 or 12 in. in diameter and about 15 in. deep may be provided with a motor operated stirrer having two to four blades about 4 in. long and three-fourths of an inch wide, suitable stationary blades and baffles being provided to prevent cyclonic motion in the mixer. The device may be surrounded by a steam jacket or may be equipped with other means for controlling temperatures.

When two parts of asphalt are emulsified in one part of water, at least 2.4% of triethanolamine oleate is required for obtaining a suitable emulsion. When the same amount of asphalt is emulsified in a tenth molar solution of sodium sulphite, a satisfactory emulsion can be obtained with only 1.0% of triethanolamine oleate. Furthermore, the emulsion produced with the dilute salt solution is much more fluid and is characterized by a much smaller particle size. By using dilute salt solutions I obtain asphalt emulsions containing from 65 to 70% asphalt which are fluid at room temperature; when using no salt, the emulsions solidify at room temperature even when 2.4% of triethanolamine oleate is employed at the same speeds and temperatures of mixing.

I have found that emulsions made with an alkali metal chromate or sulphite are more stable than those produced from other salts,—such emulsions have been heated to the boiling point of water without breaking. The presence of sodium sulphite also has the remarkable effect of preventing scum formation.

Emulsions prepared in dilute sodium carbonate solutions exhibit peculiar temperature viscosity characteristics. When the asphalt is emulsified in a tenth molar sodium carbonate solution by about 1% of triethanolamine oleate, the viscosity of the emulsion decreases with increasing temperature up to a certain point, and then as the temperature increases the viscosity again increases. A similar effect is produced when the emulsions are prepared in a dilute solution of sodium hydroxide. At temperature of about 70 to 80° F. the sodium carbonate solution emulsions are much more viscous than sodium sulphite solution emulsions. The viscosity of the latter gradually increases with decreasing temperature. The viscosity of the former decreases to a minimum at about 40°–50° F. and it then increases as the temperature continues to fall.

The most satisfactory emulsions from the standpoint of stability, ease of emulsification, fluidity, and character of residue (on evaporation of the water) are emulsions prepared in dilute solutions of salts, such as sodium sulphite, and sodium or potassium chromate. Other salts, such as sodium oxalate, trisodium phosphate, sodium sulphide and sodium thiosulphate, have given satisfactory results. In all cases, the salts added must be neutral or alkaline and an emulsion may be prepared by dispersing asphalt in a dilute solution of sodium hydroxide or spent caustic by means of triethanolamine oleate.

If it is desired to add a mineral filler, such as kaolin, fuller's earth, bentonite, or other colloidal material, the acidity of these clays must be neutralized by an alkali or an alkaline salt.

While I have described the use of oleic acid, I do not limit myself thereto and stearic acid or other equivalents may be substituted therefor. The residue from a stearic acid emulsion has a lower penetration than the same asphalt emulsified with oleic acid.

As above stated, the most satisfactory emulsions are produced by using potassium chromate and sodium sulphite. It would appear that the oxygen in these salts may have some effect on the asphalt emulsification. There are apparently at least three factors which contribute to the "activating action" of these salts on triethanolamine soap emulsifiers: (1) They decrease the interfacial tension between the asphalt and the water; (2) They maintain a proper alkalinity and (3) They exert a catalytic effect (probably, in some cases, due to the oxygen in the salt). It is believed that the addition of the alkaline salt will decrease the interfacial tension between the asphalt and the water to about one-fiftieth of its normal value. Triethanolamine soaps are slightly alkaline, and by using the salts I greatly reduce the required amounts of triethanolamine and at the same time I retain the advantages heretofore obtained with an excess of the reagent.

All grades of asphalt manufactured from Winkler and Mid-Continent crudes have been successfully emulsified by my improved process, and it is known that these bitumens are more difficult to emulsify than are ordinary tars and asphalts. The remarkable influence of the salt solutions, as hereinabove described, has been noted with ordinary soaps such as sodium oleate and commercial soap chips. It will be apparent, then, that while I have described my invention by giving a preferred embodiment thereof, it is understood that the invention is applicable to other bitumens soaps and salts, and that my invention is not limited to the details above set forth except as defined by the following claims:

I claim:

1. The method of preparing an emulsion which comprises emulsifying an asphalt with triethanolamine oleate in a dilute aqueous solution of a water-soluble salt having a neutral to basic reaction whereby the salt reduces the interfacial tension between the water and the asphalt.

2. The method of preparing a fluid, stable emulsion which comprises emulsifying bitumen with a hydroxyalkylamine soap in a dilute aqueous solution of a water-soluble salt having a neutral to basic reaction whereby the interfacial tension between the water and the bitumen is reduced by the salt.

3. The method of preparing an emulsion which comprises emulsifying a bitumen with an ethanolamine soap in the presence of a dilute aqueous solution of an oxygen-containing water-soluble salt having a neutral to basic reaction.

4. The method of claim 3 wherein the salt is sodium sulphite.

5. The method of claim 3 wherein the salt is an alkali metal chromate.

6. An emulsion comprising about two parts of asphalt, one part of water, 1% triethanolamine oleate, and a sufficient amount of a water-soluble salt having a neutral to basic reaction to give about a 0.1 molar solution in said water.

7. An asphalt emulsion containing about two parts of asphalt emulsified in one part of water by means of about 1.0% of triethanolamine oleate activated by a fraction of 1% of a water soluble oxidizing salt having a neutral to basic reaction.

8. The method of emulsifying asphalt which comprises incorporating fatty acid in said asphalt, incorporating less than 1% of triethanolamine, based on finished emulsion, in a dilute aqueous solution of a water-soluble salt having a neutral to basic reaction, and mixing said asphalt mixture with said solution.

9. The method of claim 8 wherein the salt is sodium sulphite.

10. The method of claim 8 wherein the salt is an alkali metal chromate.

HERBERT M. STEININGER.